United States Patent
Scimone

(10) Patent No.: US 9,567,059 B2
(45) Date of Patent: Feb. 14, 2017

(54) EXTERNALLY MOUNTED AUXILIARY DOOR FOR AN AIRCRAFT

(71) Applicant: Georgian Aerospace, LLC, Chesterfield, MO (US)

(72) Inventor: Michael J. Scimone, Ballwin, MO (US)

(73) Assignee: Georgian Aerospace, LLC, Chesterfield, MO (US)

(*) Notice: Subject to any disclaimer, the term of this patent is extended or adjusted under 35 U.S.C. 154(b) by 0 days.

(21) Appl. No.: 15/148,434

(22) Filed: May 6, 2016

(65) Prior Publication Data

US 2016/0325816 A1 Nov. 10, 2016

Related U.S. Application Data

(60) Provisional application No. 62/158,391, filed on May 7, 2015.

(51) Int. Cl.
| | |
|---|---|
| *B64C 1/14* | (2006.01) |
| *B64D 47/08* | (2006.01) |
| *B64D 1/02* | (2006.01) |
| *B64D 1/16* | (2006.01) |

(52) U.S. Cl.
CPC ............ *B64C 1/1407* (2013.01); *B64C 1/14* (2013.01); *B64C 1/1438* (2013.01); *B64C 1/1461* (2013.01); *B64D 1/02* (2013.01); *B64D 1/16* (2013.01); *B64D 47/08* (2013.01)

(58) Field of Classification Search
CPC ........ B64C 1/14; B64C 1/1407; B64C 1/1438; B64C 1/1461; B64D 47/08
See application file for complete search history.

(56) References Cited

U.S. PATENT DOCUMENTS

| | | | | |
|---|---|---|---|---|
| 2,445,131 | A * | 7/1948 | Wartian | B64C 1/1407 244/129.5 |
| 5,231,435 | A * | 7/1993 | Blakely | G03B 15/006 396/12 |
| 5,259,576 | A | 11/1993 | Howard | |
| 5,520,358 | A * | 5/1996 | Kahn | B64C 1/14 244/1 R |
| 5,678,787 | A | 10/1997 | Kahn et al. | |
| 6,189,833 | B1 * | 2/2001 | Ambrose | B64C 1/1407 244/118.3 |
| 7,290,736 | B2 | 11/2007 | Pahl | |

* cited by examiner

*Primary Examiner* — Nicholas McFall
(74) *Attorney, Agent, or Firm* — Armstrong Teasdale LLP

(57) ABSTRACT

A door assembly for mounting on an aircraft includes a rail mounted exteriorly to an outer skin of the aircraft, and a door movably coupled to the rail. The door assembly also includes a motor mountable in an interior of the aircraft, and a shaft extending through a sealed shaft port in the outer skin of the aircraft. The shaft couples the motor to the door, such that the door is movable between a first position and a second position along an outer moldline of the aircraft.

21 Claims, 7 Drawing Sheets

EXTERNALLY MOUNTED AUXILIARY DOOR FOR AN AIRCRAFT

CROSS REFERENCE TO RELATED APPLICATIONS

This application claims priority to U.S. Provisional Application Ser. No. 62/158,391, filed May 7, 2015, the disclosure of which is incorporated by reference in its entirety.

BACKGROUND

At least some known aircraft include payloads or other components configured to be at least partially exposed to an external environment while the aircraft is in flight. For example, but not by way of limitation, the component may be an air intake, a camera, an atmospheric monitor, another suitable sensor, ordinance, a countermeasure, or a collection/dispersion device. At least some such components may be positioned adjacent a port defined in the aircraft outer skin, such as a window or open port that provides at least partial access to the external environment. In at least some such cases, it may be desirable to at least partially conceal the component or the port, such as when the aircraft is not in flight and/or the component is not in use.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A cover or door for mounting on an aircraft is designed to conceal or at least partially conceal another component mounted on the inside or outside of the aircraft, such as a port, air intake, sight window or sight opening, a sensor, or a payload including without limitation a camera, sensor, radome, ordinance, countermeasure, atmospheric monitor or collection/dispersion device. The door is suitably configured to conform or nearly conform to the aircraft outer mold line (OML), e.g., have a low-profile, to reduce aerodynamic drag and to minimize any effect of the door on fuel consumption and performance of the aircraft. The door may also be at least partially "masked" into the aircraft OML to reduce the visibility of the door on the aircraft while providing concealment and/or protection of components installed. As used in this disclosure, the term "aircraft" includes without limitation, a fixed wing airplane, rotorcraft, lighter than air vehicle or combinations thereof, and includes piloted and remotely controlled vehicles, as well as pylons and conformally mounted tanks.

In one aspect, a door assembly for mounting on an aircraft is provided. The door assembly includes a rail mounted exteriorly to an outer skin of the aircraft, and a door movably coupled to the rail. The door assembly also includes a motor mountable in an interior of the aircraft, and a shaft extending through a sealed shaft port in the outer skin of the aircraft. The shaft couples the motor to the door, such that the door is movable between a first position and a second position along an outer moldline of the aircraft.

In another aspect, a door assembly for mounting on an aircraft is provided. The door assembly includes a rail mounted exteriorly to an outer skin of the aircraft, and a door movably coupled to the rail. The door assembly also includes an actuator system operable to move the door between a first position and a second position along an outer moldline of the aircraft. The door assembly further includes a fairing mounted on the outer skin. The fairing is shaped to extend in proximity to the outer mold line of the aircraft, and includes an opening adjacent a first end of the fairing. The fairing also includes a cover portion adjacent a second end of the fairing opposite the first end. The cover portion is sized to receive the door in the second position.

In still another aspect, an aircraft is provided. The aircraft includes a component port defined in an outer skin of the aircraft, and a door assembly. The door assembly includes a rail mounted exteriorly to the outer skin of the aircraft, and a door movably coupled to the rail. The door assembly also includes an actuator system operable to move the door between a first position and a second position along an outer moldline of the aircraft. The door in the first position conceals the component port, and the door in the second position reveals the component port to an exterior environment of the aircraft.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

DETAILED DESCRIPTION

Figure 1:
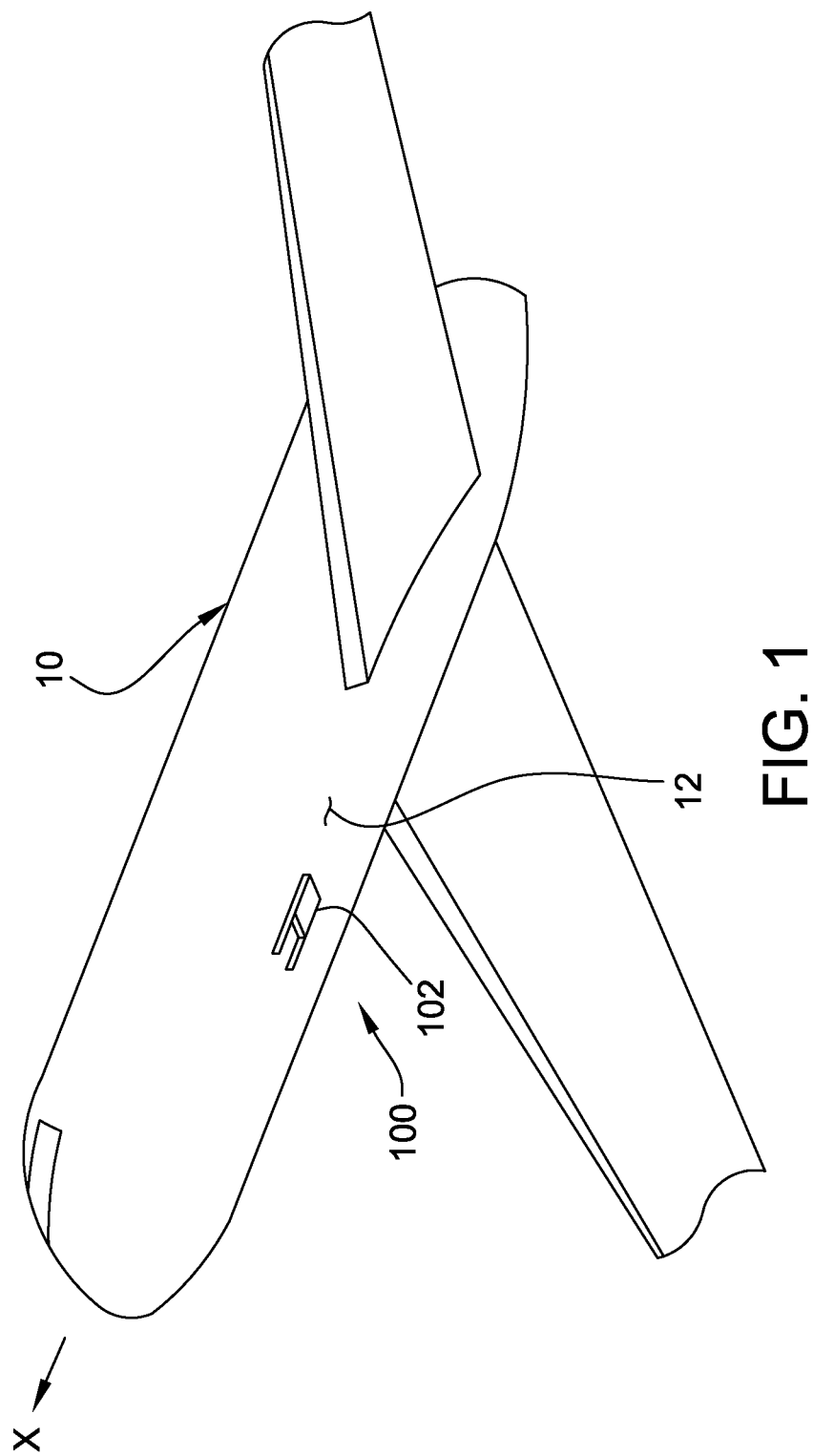
FIG. 1 is a perspective view of an embodiment of an aircraft including a door assembly mounted therein in accordance with this disclosure.
Figure 2:
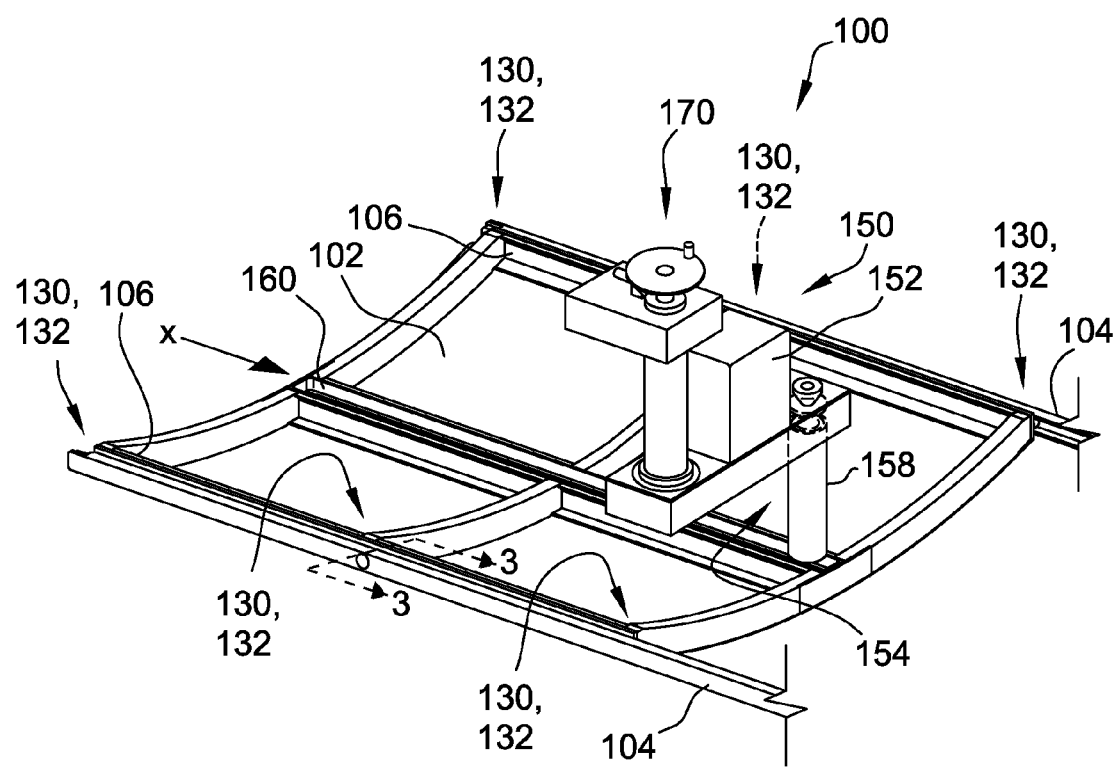
FIG. 2 is a perspective view of an embodiment of the door assembly shown in FIG. 1.
Figure 3:
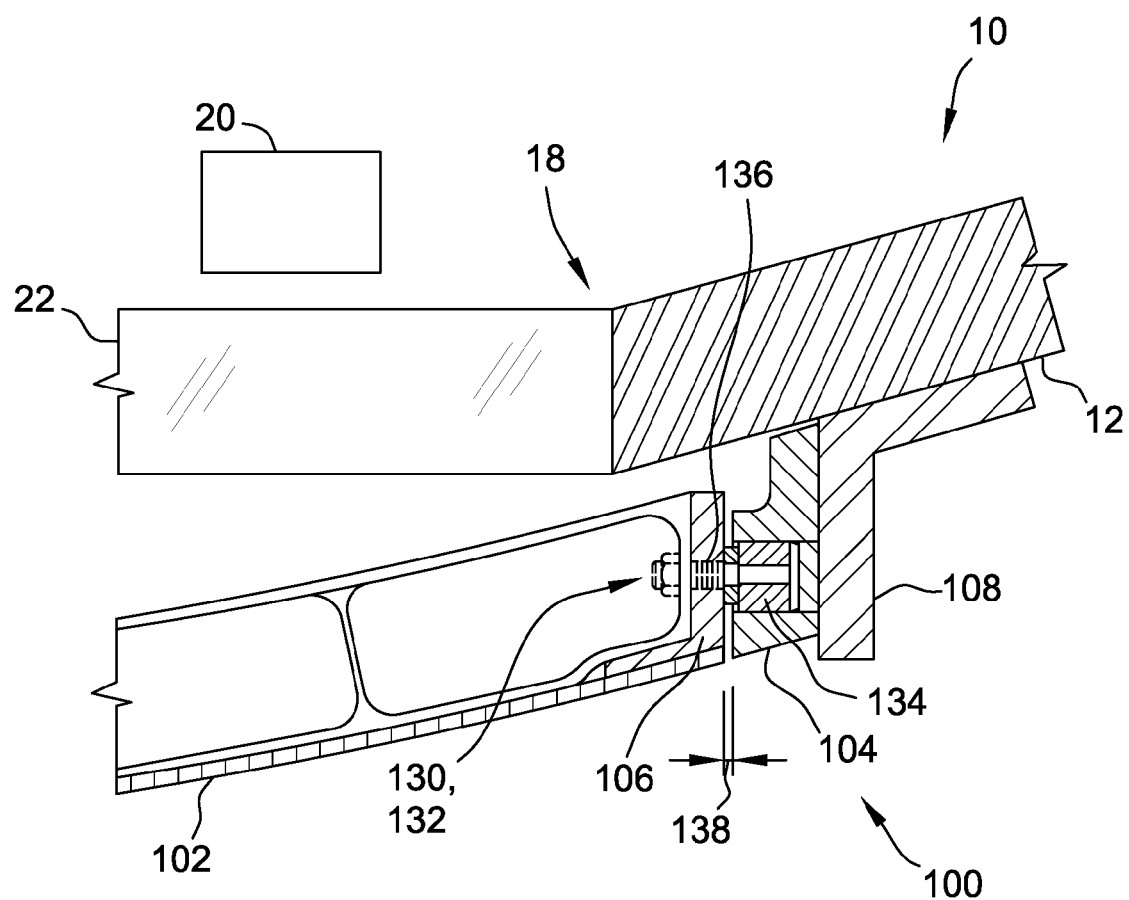
FIG. 3 is a section view of the door assembly of FIG. 1 taken along lines 3-3 shown in FIG. 2, also showing the door mounted conformal to an aircraft moldline and structure adjacent the door.
Figure 4:
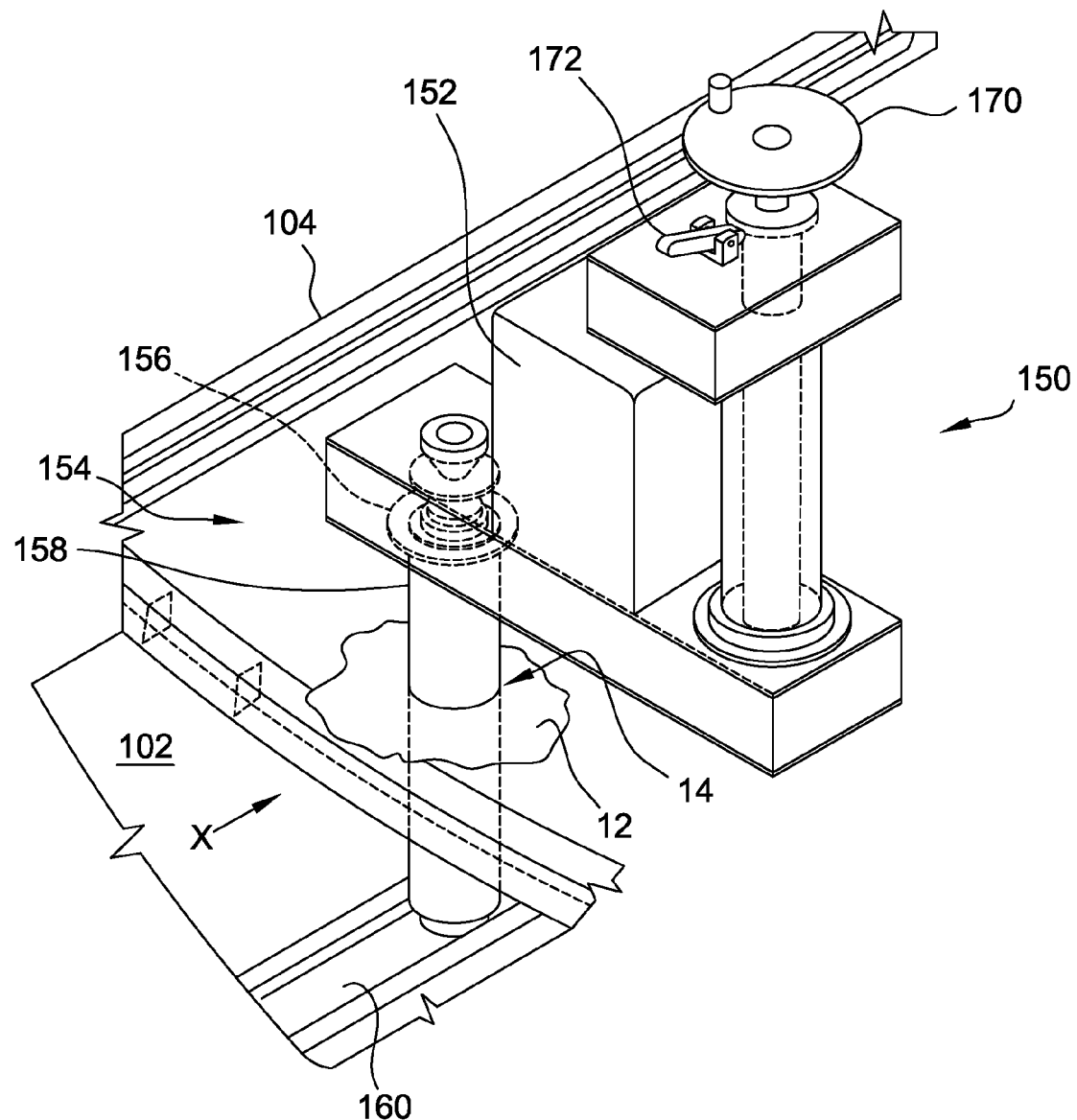
FIG. 4 is a perspective view of an actuator system of the door assembly shown in FIG. 1.

FIG. 1 is a perspective view of an embodiment of an aircraft 10 including a door assembly 100 mounted therein. FIG. 2 is a perspective view of an example embodiment of the door assembly 100. FIG. 3 is a section view of the door assembly 100 taken along lines 3-3 shown in FIG. 2. FIG. 3 also illustrates a door 102 of the door assembly mounted conformal to a moldline defined by an outer skin 12 of the aircraft 10, and additional structure of the aircraft 10 adjacent the door as will be described herein. FIG. 4 is a perspective view of an actuator system 150 of the door assembly 100.

With reference to FIGS. 1-4, the door assembly 100 includes the door 102 and at least one rail 104 configured to be mounted exteriorly to the aircraft outer skin 12. More specifically, the door 102 is movably connected or coupled to each rail 104 by a door slide mechanism 130. In the example embodiment, the at least one rail 104 includes a pair of parallel rails 104. Each of the rails 104 extends adjacent to a respective one of a pair of opposing outboard edges 106 of the door 102. In alternative embodiments, the door assembly 100 includes any suitable number of rails 104 in any suitable position with respect to the door 102. In the example embodiment, the rails 104 are configured to be generally parallel to a longitudinal axis X of the aircraft 10, such that the door 102 is slidable parallel to the longitudinal axis. In alternative embodiments, the rails 104 are configured to be disposed in any suitable direction with respect to the aircraft 10.

In the example embodiment, the actuator system 150 includes a motor 152 housed internally within the aircraft 10, that is, interiorly to the outer skin 12. The motor 152 is physically linked to the door 102, and is operable to move the door 102 along the rail 104 between a first position and a second position (shown in FIG. 5). In the example embodiment, the motor 152 is a mechanically driven electric motor. In alternative embodiments, the motor 152 is any suitable motor that enables the door assembly 100 to function as described herein.

The actuator system 150 also includes a suitable drive system 154 coupled between the motor 152 and the door 102. The drive system of the example embodiment has at least one gear 156 connected to a shaft or pinion 158 that extends through a shaft port 14 in the aircraft outer skin 12 (shown in cutaway view in FIG. 4). In the case of a pressurized aircraft the shaft port 14 is sized to receive and to seal the shaft 158 to maintain cabin pressure. The shaft port 14 is disposed along a plane relatively parallel to the aircraft outer skin 12 with the shaft 158 relatively perpendicular to the skin. In alternative embodiments, the drive system 154 operably couples the motor 152 to the door 102 in any suitable fashion.

In the example embodiment, a slot or rack gear path 160 disposed on an interior surface of the door 102 is configured to receive the pinion shaft 158 and to enable the door to be "force" driven by the actuator system 150. Alternatively, another suitable interface is used, such as a belt driven system, e.g., wherein the gear path 160 includes an intermeshing gear interface (not shown). These types of force driven systems, wherein components of the actuator system 150 other than the pinion shaft 158 and receiving slot 160 are located internal to the aircraft 12, enable a mechanical-based design with better reliability, manufacturability and reduced risk of failure, e.g., failure of components mounted external to the aircraft outer skin 12.

In the example embodiment, the actuator system 150 includes a manual override mechanism 170, such as but not limited to a hand crank, for driving the door 102 closed in case of a failure of the primary system. A manual override switch 172 locks the manual override mechanism 170 when not in use. In alternative embodiments, the actuator system 150 includes any suitable manual override system, or no manual override system.

Figure 5:
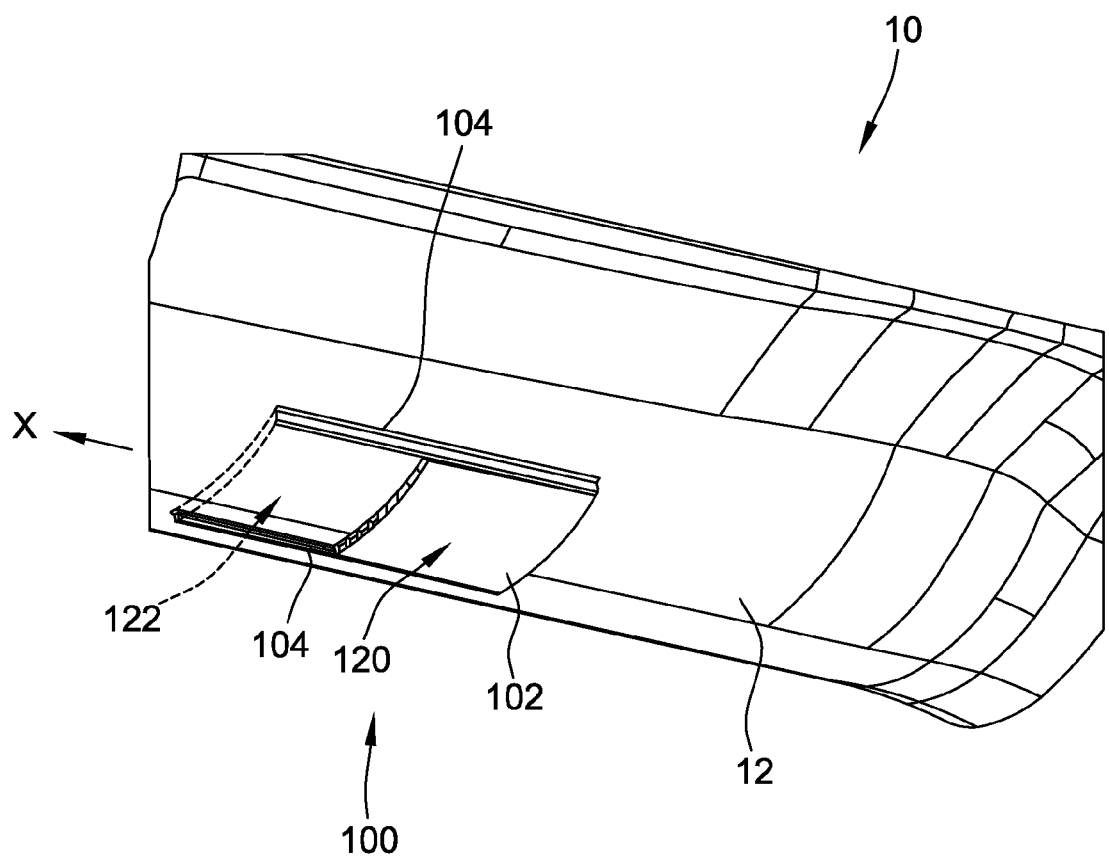
FIG. 5 is another perspective external view of the aircraft including the door assembly of FIG. 1.

FIG. 5 is another perspective external view of the aircraft 10 including the door assembly 100 mounted therein. With reference to FIGS. 1-5, the door 102 moves generally linearly as it slides along the rail 104 adjacent, and exterior to, the aircraft outer skin 12 between a first position 120 and a second position 122. In the example embodiment, the first position is a fully closed position, and the second position is a fully open position. In alternative embodiments, each of the first and second positions is any suitable position along the rail 104. In the example embodiment, the door 102 slides longitudinally relative to the aircraft axis X. In alternative embodiments, the door 102 slides along the rail 104 disposed in any suitable direction relative to the aircraft 10, such as laterally.

In certain embodiments, the door slide mechanism 130 coupling the door 102 to the at least one rail 104 is designed to prevent or eliminate the possibility of door "racking" or sticking, e.g., where the door 102 does not fully extend to the first position 120 or fully retract to the second position 122. As a non-limiting example, as shown in FIG. 3, the door slide mechanism 130 includes at least one roller bearing assembly 132 positioned along the outboard edge 106 of the door. Each roller bearing assembly includes a roller bearing 134 loaded by a spring 136 to prevent racking of the door 102 during translation along the rail 104 by the drive system 154. In alternative embodiments, the door slide mechanism 130 reduces or eliminates the possibility of door "racking" or sticking in any other suitable fashion.

In the example embodiment, as shown in FIG. 2, the door slide mechanism 130 includes three roller bearing assemblies 132 spaced apart along each outboard edge 106 of the door 102. In alternative embodiments, the door slide mechanism 130 includes any suitable number of roller bearing assemblies 132 spaced in any suitable fashion along each outboard edge 106. In addition, the door slide mechanism 130 may include guide pins (not shown) located intermediately along each outboard edge 106 to ensure a smooth transition. In certain embodiments, the door slide mechanism 130 defines a space 138 (shown in FIG. 3) between the outboard edge 104 and the rail 104 sufficient to enable movement of the door 102 regardless of bending of the door and surrounding structure, e.g., due to expansion/contraction or bending during flight.

Each rail 104 of this embodiment is mounted on the aircraft 10 using a suitable mounting structure 108. In the illustrated embodiment, the mounting structure 108 includes a bracket of L-shaped cross-section extending adjacent the rail 104, with one "leg" of the L coupled to the aircraft outer skin 12 and the other "leg" of the L coupled to the rail 104. In alternative embodiments, each rail 104 is coupled to the aircraft in any suitable fashion that enables the door assembly 100 to function as described herein.

As illustrated in FIG. 3, a component port 18 is defined in, and extends through, the aircraft outer skin 12 proximate the door assembly 100. Moreover, in some such embodiments, a component 20 is positioned internally within the aircraft 10, interiorly and adjacent to the component port 18. More specifically, the component port 18 and the component 20 are positioned with respect to the door assembly 100 such that the door 102 in the first position hides or conceals the component port 18 and the component 20 from external view, and the door 102 in the second position reveals the component port 18, thereby enabling access by the component 20 to an exterior environment of the aircraft 10 via the component port 18.

In the illustrated embodiment, a window 22 is sealingly positioned in the component port 18, such that cabin pressure is maintained interiorly to the outer skin 12 proximate the component 20. For example, the component 20 is an electromagnetic sensor system or human observer, and the window 22 is transparent to at least one electromagnetic wavelength detectable by the sensor system 20 or the human observer, while enabling the aircraft 10 to maintain cabin pressure. In alternative embodiments, the component port 18 is unsealed, i.e. open, such that at least a portion of the interior of the aircraft 10 is in flow communication with the environment exterior to the outer skin 12 via the component port 18 when the door 102 is in the second position 122. For example, the component 20 is a collection/dispersion device, and the component port 18 enables flow communication between the component 20 and the atmosphere external to the aircraft 10. In some such embodiments, the interior of the aircraft 10 proximate the component 20 is sealed off in a suitable fashion from a pressurized portion of the aircraft cabin. In particular, the sealed shaft port 14, as described above, enables the actuator system 150 to be accessible to crew in the pressurized portion of the aircraft cabin adjacent the unsealed component port 18.

When the door 102 is in the open position and the component port 18 is not sealed, a sensor (not shown) may be extended through the component port 18 from the component 20. For example, the sensor may include a camera/sensor/radome that is mounted on an elevator to extend the unit during use and retract to a stored position when not in use. The cloaking door 102 in the closed position would conceal and protect the sensor.

As discussed above, the component port 18 of the unsealed variety may be configured for atmospheric data collection, the dispensing of ordnance, countermeasures, or dispersing materials into the atmosphere, such as liquid, aerosol or dry materials including fire retardant, silver iodide, and/or environmentally friendly defoliant, as examples without limitation.

The door assembly 100 in this example embodiment protects and/or conceals component 20. The component may be an extendable/deployable sensor or other payload. The payload or sensor may be extendable or deployable throughout the aircraft flight envelope, or only in a portion of the flight envelope. The door 102 may be controlled or moved to the second or open position 122 by a suitable control system (not shown) when required by the mission or payload operation. Thereafter, the door 102 can be controlled to move to its first or closed position 120. In this closed position, the payload is concealed, and the door 102 itself is difficult to see or visualize.

The door operation may be controlled by a flight crew or, alternatively, remote operator controlled. Control may be based on factors including the equipment installed and mission requirements. Control may also be automatic in some cases, such as automatic closure when the landing gear are extended for landing. The controlling function can be mechanized by different means electrically or mechanically. As discussed above, the door actuator system 150 may also include a mechanical backup such as the manual override mechanism 170 in case of electrical motor failure. For example, the mechanical backup can be mechanized to allow for emergency extension or retraction by the crew via the cranking handle (shown in FIG. 4) or a pump.

In another embodiment, the component port 18 is again of the unsealed variety, and serves as an auxiliary air intake that is used to allow air to enter into the aircraft and/or engine through a port. Several different types of inlet ports may be used in combination with the door assembly 100. OML or near OML inlet ports can include an open inlet duct, open inlet plenum, an inlet screen, a particle separator or a barrier filter. As examples, the component port 18 may include a pair of adjacent component ports 18 of different inlet types, and the door 102 may be selectively controlled between the first and second positions to change between the inlet types, or may be open or closed to protect an inlet port. The component port 18 may provide an air intake for environmental air, engine intake, or Auxiliary Power Unit (APU) intake among other examples.

Figure 6:
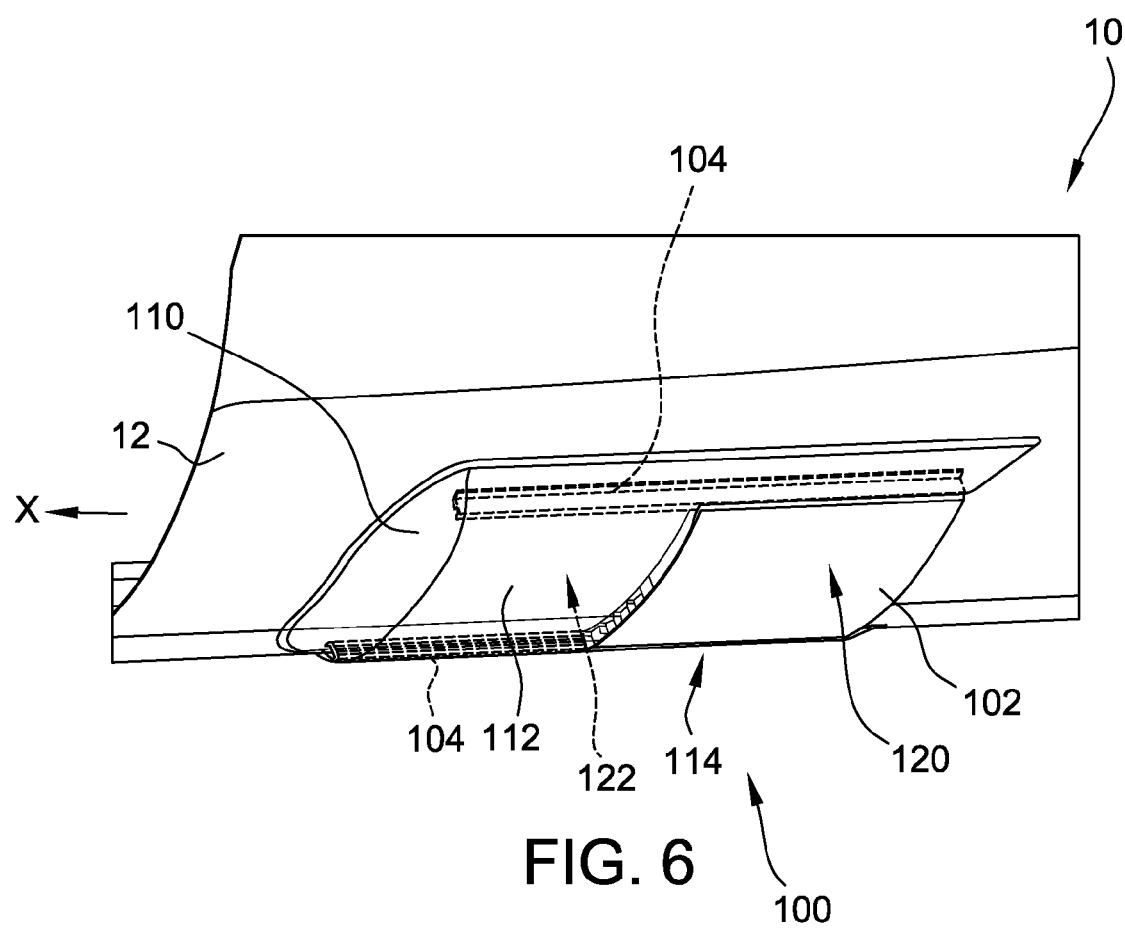
FIG. 6 is a perspective view of another embodiment of an aircraft including the door assembly of FIG. 1 mounted therein.
Figure 7:
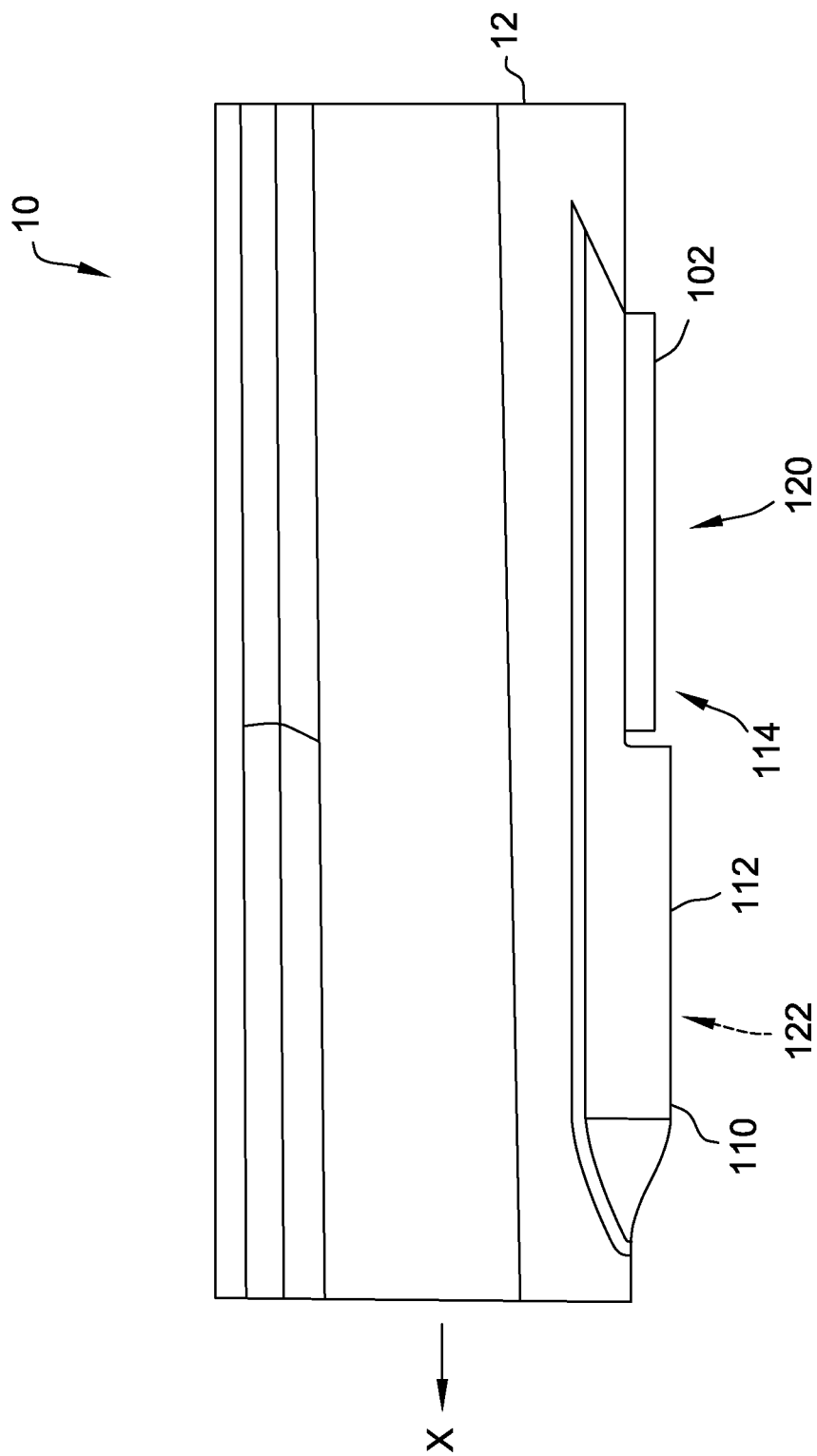
FIG. 7 is a side view of the aircraft and door assembly of FIG. 6.

FIG. 6 is a perspective view of another embodiment of the aircraft 10 including the door assembly 100 mounted therein. FIG. 7 is a side view of the aircraft 10 and door assembly 100 shown in FIG. 6. With reference to FIGS. 2-4, 6, and 7, in the illustrated embodiment, the door assembly 100 includes a fairing 110 mounted on the aircraft outer skin 12. The fairing 110 is shaped to extend in proximity to the OML of the aircraft 10. The fairing defines an opening 114 adjacent a first end of the fairing. The opening 114 is at least partially aligned with the component port 18, such that the fairing 110 does not obstruct the component port 18 when the door 102 is in the second position 122. The fairing 110 also includes a cover portion 112 adjacent a second end of the fairing opposite the first end. The cover portion 112 is sized to receive the door 102 in the second or open position 122. In some embodiments, the fairing 110 reduces a dynamic pressure that tends to resist movement of the door 102 between the first and second positions when the aircraft 10 is in flight, thereby improving a controllability of the door 102 and/or decreasing a power required from the motor 152.

In this embodiment, the rails 104 are mounted to the fairing 110. In other embodiments, the rail or rails 104 is mounted directly to the outer skin 12, for example in the same fashion as discussed above with respect to the mounting structure 108.

The door assembly 100 mounted on an aircraft as disclosed herein will accommodate operation of the aircraft in forward flight up to the limits of the aircraft ground and flight envelope, or through the ground or flight envelope of a rotorcraft including hover conditions, and in the case of a lighter than air vehicle throughout the flight envelope.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A door assembly for mounting on an aircraft, the door assembly comprising:
   a rail mounted exteriorly to an outer skin of the aircraft;
   a door movably coupled to the rail;
   a motor mountable in an interior of the aircraft; and
   a shaft extending through a sealed shaft port in the outer skin of the aircraft, wherein the shaft couples the motor to the door, such that the door is movable between a first position and a second position along an outer moldline of the aircraft.

2. The door assembly of claim 1, further comprising at least one roller bearing assembly coupled to an outboard edge of the door, the at least one roller bearing assembly received by the rail to movably couple the door to the rail.

3. The door assembly of claim 1, further comprising a fairing mounted on the outer skin, the fairing shaped to extend in proximity to the outer mold line of the aircraft, the fairing comprising:
   an opening adjacent a first end of the fairing; and
   a cover portion adjacent a second end of the fairing opposite the first end, the cover portion sized to receive the door in the second position.

4. The door assembly of claim 1, wherein the shaft is a pinion shaft, the door assembly further comprising a gear path disposed on an interior surface of the door and configured to receive the pinion shaft.

5. The door assembly of claim 1, wherein the door in the first position is configured to conceal a component port defined in the outer skin of the aircraft, and the door in the second position is configured to reveal the component port to an exterior environment of the aircraft.

6. The door assembly of claim 1, further comprising a manual override mechanism operable to move the door between the first and second positions without operation of the motor.

7. A door assembly on an aircraft, the door assembly comprising:
a rail mounted exteriorly to an outer skin of the aircraft;
a door movably coupled to the rail;
an actuator system operable to move the door between a first position and a second position along an outer moldline of the aircraft; and
a fairing mounted on the outer skin and fixed with respect to the outer skin, the fairing shaped to extend in proximity to the outer mold line of the aircraft, the fairing comprising:
an opening adjacent a first end of the fairing; and
a cover portion adjacent a second end of the fairing opposite the first end, the cover portion sized to receive the door in the second position.

8. The door assembly of claim 7, further comprising at least one roller bearing assembly coupled to an outboard edge of the door, the at least one roller bearing assembly received by the rail to movably couple the door to the rail.

9. The door assembly of claim 7, wherein the actuator system comprises:
a motor; and
a shaft extending through a sealed shaft port in the outer skin of the aircraft, wherein the shaft drivingly couples the motor to the door.

10. The door assembly of claim 9, wherein the shaft is a pinion shaft, the door assembly further comprising a gear path disposed on an interior surface of the door and configured to receive the pinion shaft.

11. The door assembly of claim 9, further comprising a manual override mechanism operable to move the door between the first and second positions without operation of the motor.

12. The door assembly of claim 7, wherein the door in the first position is configured to conceal a component port defined in the outer skin of the aircraft, and the door in the second position is configured to reveal the component port to an exterior environment of the aircraft.

13. An aircraft comprising:
a component port defined in an outer skin of the aircraft; and
a door assembly comprising:
a rail mounted exteriorly to the outer skin of the aircraft;
a door movably coupled to the rail; and
an actuator system comprising a shaft extending through a sealed shaft port in the outer skin of the aircraft, the shaft coupled to the door and operable to move the door between a first position and a second position along an outer moldline of the aircraft, wherein the door in the first position conceals the component port, and the door in the second position reveals the component port to an exterior environment of the aircraft.

14. The aircraft of claim 13, wherein the door assembly further comprises at least one roller bearing coupled to an outboard edge of the door, the at least one roller bearing received by the rail to movably couple the door to the rail.

15. The aircraft of claim 13, further comprising a fairing mounted on the outer skin, the fairing shaped to extend in proximity to the outer mold line of the aircraft, the fairing comprising:
an opening adjacent a first end of the fairing; and
a cover portion adjacent a second end of the fairing opposite the first end, the cover portion sized to receive the door in the second position.

16. The aircraft of claim 13, further comprising a window sealingly positioned in the component port.

17. The aircraft of claim 13, wherein the component port is unsealed, such that at least a portion of an interior of the aircraft is in flow communication with the exterior environment via the component port when the door is in the second position.

18. The aircraft of claim 13, wherein the aircraft is one of a fixed wing aircraft, a helicopter, and a lighter than air vehicle.

19. A door assembly for an aircraft, the door assembly comprising:
a rail mounted exteriorly to an outer skin of the aircraft;
a door movably coupled to the rail;
an actuator system operable to move the door longitudinally, with respect to a longitudinal direction of the aircraft, along an outer moldline of the aircraft between a first position and a second position; and
a fairing coupled to the outer skin, the fairing extending in proximity to the outer mold line of the aircraft, the fairing comprising:
an opening adjacent the first position of the door; and
a cover portion offset longitudinally from the opening, the cover portion adjacent the second position of the door and sized to receive the door.

20. The aircraft of claim 19, wherein the actuator system comprises:
a motor; and
a shaft extending through a sealed shaft port in the outer skin of the aircraft, wherein the shaft drivingly couples the motor to the door.

21. The aircraft of claim 20, wherein the shaft is a pinion shaft, the door assembly further comprising a gear path disposed on an interior surface of the door and configured to receive the pinion shaft.

* * * * *